United States Patent [19]

Leiser et al.

[11] 4,366,060

[45] Dec. 28, 1982

[54] PROCESS AND EQUIPMENT FOR CHROMATOGRAPHIC SEPARATION OF FRUCTOSE/DEXTROSE SOLUTIONS

[75] Inventors: Roger S. Leiser; Gin C. Liaw, both of Decatur, Ill.

[73] Assignee: A. E. Staley Manufacturing Company, Decatur, Ill.

[21] Appl. No.: 973,494

[22] Filed: Dec. 26, 1978

Related U.S. Application Data

[62] Division of Ser. No. 762,072, Jan. 24, 1977, abandoned.

[51] Int. Cl.$^3$ .............................................. B01D 15/08
[52] U.S. Cl. .................................. 210/635; 210/659; 210/198.2; 127/46.2
[58] Field of Search ................ 210/31 C, 198 C, 291, 210/292, 286, 201, 190, 635, 659; 127/9, 46 R, 46 A; 55/179, 386, 387, 389

[56] References Cited

U.S. PATENT DOCUMENTS

| | | | |
|---|---|---|---|
| 454,340 | 6/1891 | Fulton | 210/291 |
| 2,772,780 | 12/1956 | Penick | 210/292 |
| 3,780,866 | 12/1973 | Ek et al. | 210/198 C |
| 3,785,864 | 1/1974 | Lauer et al. | 127/9 |
| 3,928,193 | 12/1975 | Melaja et al. | 210/198 C |
| 4,055,493 | 10/1977 | Sawanishi et al. | 210/31 C |
| 4,133,696 | 1/1979 | Barker | 127/46 A |

Primary Examiner—John Adee

Attorney, Agent, or Firm—M. Paul Hendrickson; Charles J. Meyerson

[57] ABSTRACT

Large-scale apparatus and process for chromatographic separation of fructose/dextrose sugar solutions employing large diameter beds of a strongly cationic salt of an ion exchange resin. The cationic ion exchange resin is densely and uniformly packed in a separation column by means of a resin loading method which includes washing the resin with a salt selected from the group of calcium, barium, strontium or silver salts of the resin. The shrunken resin is then placed in the column to completely fill the column. After sealing the column, excess salt is washed away to thereby expand the resin inside the confined separation column chamber.

The uniformly dense packing of the resin in the separation column chamber eliminates the need for mechanical baffles which were formerly required to insure regular and uniform flow throughout the entire cross sectional area of the separation columns. Large diameter separation columns without baffles are made possible by the column packing method of the invention because undesirable channeling or irregular flow in the densely packed resin bed is virtually eliminated. A liquid feed stream containing fructose and dextrose and a second stream of elution water are fed through a series of separation columns in alternate, cyclic pulses. The liquid streams are further redistributed between the successive columns of the series to further increase the degree of separation of the output stream into a portion rich in fructose, and another output stream rich in dextrose.

41 Claims, 5 Drawing Figures

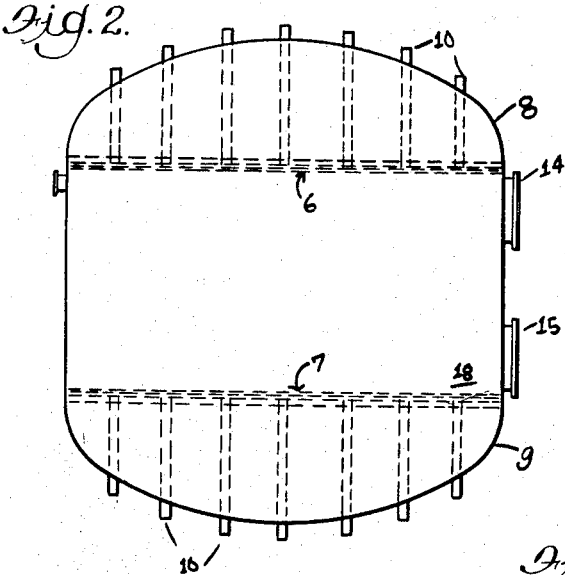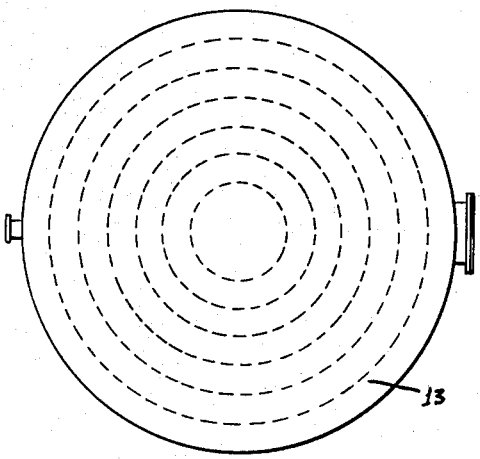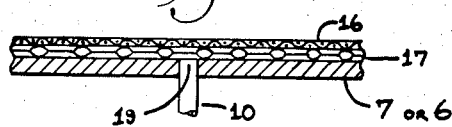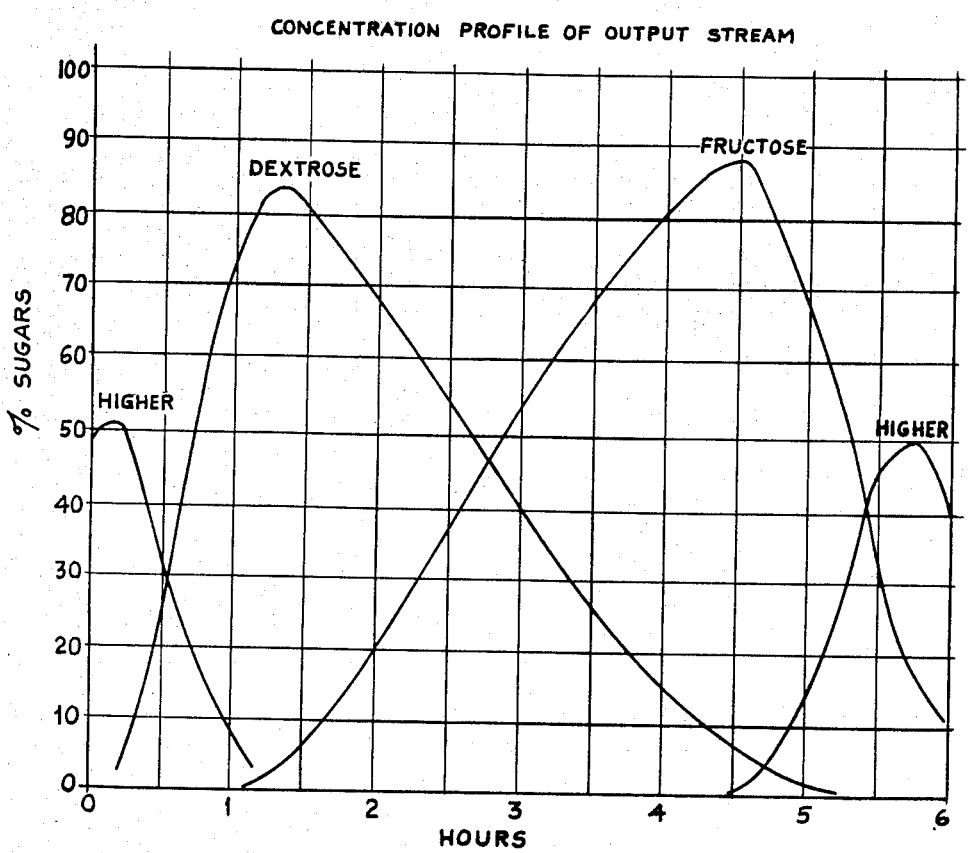

PROCESS AND EQUIPMENT FOR CHROMATOGRAPHIC SEPARATION OF FRUCTOSE/DEXTROSE SOLUTIONS

This is a division of application Ser. No. 762,072, filed Jan 24, 1977 now abandoned.

BACKGROUND OF THE INVENTION

The use of strong cationic exchange resins has been disclosed for the separation of fructose and dextrose sugars. In the past, such mixtures were characteristic by-products in the preparation of sucrose from sugar beets or sugar cane. Invert sugar, containing about 50% fructose and 50% dextrose, has been separated by means of liquid chromatography into a fructose-rich portion and a dextrose-rich portion. This process is sometimes called molecular exclusion. Recently, isomerization processes have made possible the commercialization of high fructose corn syrup sweeteners which contains 40-45% fructose, 40-50% dextrose and about 3-8% higher polysaccharides, but such products are not quite as sweet as sucrose. Products containing 55-65% fructose have about the same level of sweetness as sucrose, and can be directly substituted for sucrose in food recipes. The cost of increasing the fructose level higher than about 45% by enzyme treatment accelerates drastically using present commercial processes, so efforts have been made to further increase the fructose content of such sugar mixtures by liquid chromatography.

Chromatographic separation of sugar solutions containing fructose and dextrose has been proposed and used as a means of further increasing the fructose content of fructose/dextrose containing syrups by passing the mixture through an adsorbent resin bed containing a cationic salt of a nuclearly sulfonated, crosslinked polystyrene resin or other adsorbent. When the above named resin is used, fructose has greater affinity than dextrose has for the resin, and the fructose is "held back" in the resin bed, while dextrose passes on through as an effluent stream. The sugar solution and an elution water stream are alternately fed into the resin bed, and the effluent stream contains a dextrose-rich portion followed by a fructose-rich portion which are collected separately. Much effort has been directed towards improving the efficiency of the separation so that it can be scaled up to large volume commercial systems. Flow dynamics through large separation columns must be carefully controlled in order to obtain an optimum separation.

DESCRIPTION OF THE PRIOR ART

Various processes and systems have been proposed for more efficiently separating fructose from dextrose by means of molecular exclusion. U.S. Pat. No. 2,911,361 (which issued Nov. 3, 1959) broadly discloses the concept of utilizing a strong cationic exchange resin for the separation of two or more water-soluble organic substances, including glucose, acetone, sucrose, glycerin, and triethyleneglycol. This reference generally discloses that aldehydes and ketones can be separated. Among the resins disclosed in this patent is included the granular cationic exchange resins of the general type used here, but in hydrogen form. The resin is a sulfonated copolymer of styrene, ethylvinylbenzene and divinylbenzene.

Chromatographic absorption on aluminum to produce highly active streptomycin was described by Williams et al., "Chromatography", Chemical Engineering, November, 1948, Vol. 55:133-8. In addition to aluminum, other absorbents are disclosed, including activated carbon, silica gel, Floridin and Zeolites. Absorption columns up to 3 feet in diameter and 12 feet in height are described in this reference.

The separation of D-glucose and D-fructose from invert sugar or sucrose is disclosed in U.S. Pat. No. 2,813,810 issued Nov. 19, 1957. D-glucose is separated from invert sugar or mixtures of equal parts of D-glucose or D-sucrose by shaking the mixture with a ketone containing a small amount of water in the presence of a cationic exchange resin. The preferred cationic exchange resins are the sulfonated type such as sulfonated phenalformaldehyde exchange resins, nuclearly sulfonated polystyrene ion exchange resins (hydrogen ion form), sulfonated coal and the like.

U.S. Pat. Nos. 3,044,904, 3,044,905 and 3,044,906 disclose chromatographic separation of dextrose and levulose using various resin salts of a nuclearly sulfonated styrene cationic exchange resin. The levulose (fructose) in a mixed fructose/dextrose feed stream is preferentially absorbed by the resin, leaving a major portion of the dextrose dissolved in the liquid surrounding the cationic exchange resin. The dextrose is then forced out of the column by elution water which washes out the fructose separately from the dextrose. The typical separation column disclosed in U.S. Pat. No. 3,044,904 is approximately 3.75 inches in internal diameter and was filled to a depth of 38 inches. The calcium salt form of the resin was employed in this patent. Flow rates of 0.1 to 0.5 gallons per minute per square foot of cross sectional area were found satisfactory, and a temperature range of 50°-70° C. was preferred.

A recycle system for chromatographic separation processes such as described in U.S. Pat. No. 3,044,904 in U.S. Pat. No. 3,416,961 issued Dec. 17, 1968 U.S. Pat. No. 3,817,787 (issued June 18, 1974) utilizes the same cationic exchange resins and describes a preferred column length for more efficient separation.

A dynamic packing method for packing ion exchange resins in chromatographic columns is described in Journal of Chromatography, Vol. 42, (1969) pp. 263-65. However, it should be noted that the resin particles being packed range in size from 5-10 microns, and that the column diameters were only 0.62 centimeters. The packing methods disclosed involved first packing the resin in a cartridge or chamber, and then displacing the resin in the cartridge or chamber forcing it into the column. No mention of swelling the resin is made.

It has been observed that the calcium salt form of the nuclearly sulfonated polystyrene cationic exchange resin occupies less volume in the presence of a strong salt solution, but no useful application of this phenomenon has been found in the prior art. See, for example, U.S. Pat. No. 3,928,193 which issued Dec. 23, 1975.

The swelling and shrinking of the resin bed is described as a "nuisance" in U.S. Pat. No. 3,928,193. This patent describes the problems created by non-uniform flow of feed stream and elution water, and proposes an open top resin bed over which the feed stream and the elution streams are alternately sprayed to insure uniform flow of liquid through the column.

U.S. Pat. No. 3,928,193 refers to two other U.S. Pat. Nos. 3,250,058 (issued May 10, 1966) and 3,539,505 which issued Nov. 10, 1970. In addition, U.S. Pat. No. 3,374,606 issued on the same parent application on which U.S. Pat. No. 3,250,058 was based. All three of these patents are directed to distribution structures for improving the separation ability of the resin bed columns. Mechanical flow distributor devices are inserted in the columns at intervals to improve the resolving power of the large diameter columns by redistributing the flow patterns to cancel the effects of channeling and turbulence in the resin beds.

U.S. Pat. No. 3,250,058 includes disk-shaped and doughnut-shaped baffles alternately disposed at intervals in the length of the bed no greater than the diameter of the column. The relatively "large diameter" glass tube columns described in this patent had an internal diameter of about 49 millimeters (about 0.2 inch). The columns were about four feet in length. (See sentence bridging Columns 4 and 5 of U.S. Pat. No. 3,250,058.)

Related U.S. Pat. No. 3,374,606 discloses the use of sieve plates disposed at regular intervals in a chromatographic column. The "large diameter" column disclosed here was a 4 inch diameter column (6.16 centimeters). The detailed description appears to be directed to gas chromatography columns employing carrier liquids such as helium, nitrogen argon, hydrogen methane, steam or the like. See Column 3, lines 61–63 of U.S. Pat. No. 3,374,606.

U.S. Pat. No. 3,539,505 is specifically directed to "large scale" columns for chromatographic separation of liquid streams. Fluid mixing means are disposed at intervals throughout the column to prevent "distored running" of the fronts of liquids of different concentrations developing in the column length as the feed stream and elution stream are alternately fed through the column. This reference points out that "distorted running" cannot be avoided even when proceeding very carefully. The largest of the so called "large diameter" columns disclosed in U.S. Pat. No. 3,539,505 is 1.2 meters in diameter (about 3.96 feet) and 15 meters (48.2 feet) long (e.g. see Example 5).

Timmins et al., "Large-Scale Chromatography: New Separation Tool", *Chemical Engineering,* Vol. 76, pp. 170–178, May 1969 discloses a fourteen foot diameter gas chromatographic column (p 177), but this column included "radial mixing means to control nonuniformities" (p. 178), probably of the type described in U.S. Pat. No. 3,250,058. The subject reference also describes liquid chromatography columns which also include radial mixing means, but the largest diameter liquid separation columns described is only about four foot in diameter, which indicates that channeling and turbulent flow were considered more difficult to control in liquid systems even with radial mixing means such as described in U.S. Pat. No. 3,250,058.

There are a number of more recent patents directed to modifications of the process described in U.S. Pat. No. 3,044,094. For example, U.S. Pat. No. 3,483,031 issued Dec. 9, 1969 claims a process for inverting sucrose, and then recovering fructose and glucose by contacting the aqueous solution of sucrose or sucrose-containing invert sugar with an ion exchanger charged with calcium ions containing 1 to 30% free acid groups. U.S. Pat. No. 3,416,961 describes the type of process disclosed in U.S. Pat. No. 3,044,094 in which the effluent stream is divided into at least six fractions, and at least two of the six fractions are recycled through the separation column.

The columns employed by the U.S. Pat. No. 3,483,031 patentees had diameters of 15 centimeters (about 5.9 inches). It should be noted that the shrinking and and swelling phenomenon of the resin is described at column 5, lines 11–14 as a disadvantage which might cause bursting of the glass columns. To avoid this undesirable effect caused by this resin property, these patentees employ six glass tubes, each 2 meters in length and they maintain a resin bed depth of only 1.5 meters in each glass tube for a total resin bed depth of about 9 meters (about 32.7 feet), and a diameter of only 15 centimeters (about 5.9 inches). The U.S. Pat. No. 3,416,961 patentees describe a resin bed with a space above it, also (e.g. see column 7, lines 48–50).

SUMMARY OF THE INVENTION

The method and apparatus of the subject invention provides means for substantially improving the efficiency of chromatographic separation of mixed sugar solutions by means of large diameter separation columns containing a densely and uniformly packed particulate adsorbent. The method for packing adsorbent in the separation columns utilizes to advantage the fact that certain adsorbents shrink in volume when exposed to concentrated salt solutions and subsequently expand in volume when the adsorbent is washed to remove excess unbound salt. A separation column is filled to capacity with contracted adsorbent, the column is then closed and the adsorbent washed, causing it to swell and become densely packed in the column chamber.

The packing system described is particularly applicable to calcium salts of crosslinked, nuclearly sulfonated polystyrene resins. These resins are particularly suited for the separation of mixed fructose and dextrose sugar solutions, and are sold under various tradenames, including Amberlite XE-200 (Rohm & Haas, Inc.), Dowex 50WX4 (Dow Chemical, Inc.) and ZeoKarb 225 (Permutit, Inc.).

Such resins are usually sold in the hydrogen or sodium ion form, and have a normal void volume of about 30%. When treated with a strong calcium chloride solution, the resin shrinks in total volume to less than 90% of the original volume. A separation column is then filled with the contracted resin, and the resin is confined therein.

The confined resin is then washed with water to remove unbound salt. The resin expands, creating a positive expansion pressure within the separation column. This expansion pressure uniformly and densely packs the resin in the column, and when liquid is passed through the column, channeling effects and turbulence are prevented by the densely packed resin bed. The resin packing method of the invention makes possible the utilization of large diameter adsorbent beds without a requirement for internal baffling or flow distributing structures. Separation column resin beds up to 14 feet in diameter and 7 feet in height are described herein, and it is contemplated that substantially larger diameter resin beds may be utilized without the need for internal flow distributing structures, thereby substantially increasing the total output volume from the system.

In the system described, a plurality of 14 feet diameter, 7 feet tall cylindrical columns are disposed in series. Each column contains the densely and uniformly packed particulate adsorbent, and each column is provided with flow means communicating through the successive columns for conveying therethrough a feed stream, an elution stream and a possible recycle stream in a predetermined sequence. The volume and total time of flow of a particular feed stream into the column can be controlled by the desired output and the input stream. The output streams can be controlled by refractive index sensing means or optical rotation sensing means and timing devices, or combinations of these.

The volume of the input feed stream may vary from 0.3 to 1.0 of the bed volume per cycle of feed stream. For the system described, the elution water volume required is about 0.6 of the bed volume when the input feed stream is about 0.5 of the bed volume.

Using an input feed stream containing 42% fructose, 50% dextrose and 8% higher saccharides at about 50% dry solids, it is possible to control the effluent streams to obtain a fructose concentration from 39–99+%. The flow rate presently contemplated through the system is about 0.4–0.7 gallons per minute/ft.$^2$, and the system is operated at a temperature in the range of 120°–160° F. to obtain the best results.

The large diameter separation columns of the subject invention provide an economical system for the chromatographic separation of mixed sugar solutions containing fructose and dextrose and other higher sugars. Such higher fructose sugars are derived from corn starch which is in plentiful supply. These higher fructose corn sweeteners provide equivalent sweetening to sucrose at less cost and with less calories.

BRIEF DESCRIPTION OF THE DRAWINGS

FIG. 2 is a diagrammatic side view partially in section showing details of the construction of a separation column employed in the system of FIG. 1;

FIG. 3 is a diagrammatic view with parts omitted, taken generally on line 3—3 of FIG. 2 showing the annular configuration of the top and bottom reinforcements for the separation column;

FIG. 4 is an enlarged detail sectional view taken generally at area A of FIG. 2 showing the resin retaining means and a detail of the flow distribution system; and FIG. 5 is a typical concentration profile for the output stream of a three column series.

DETAILED DESCRIPTION OF THE INVENTION

Figure 1:
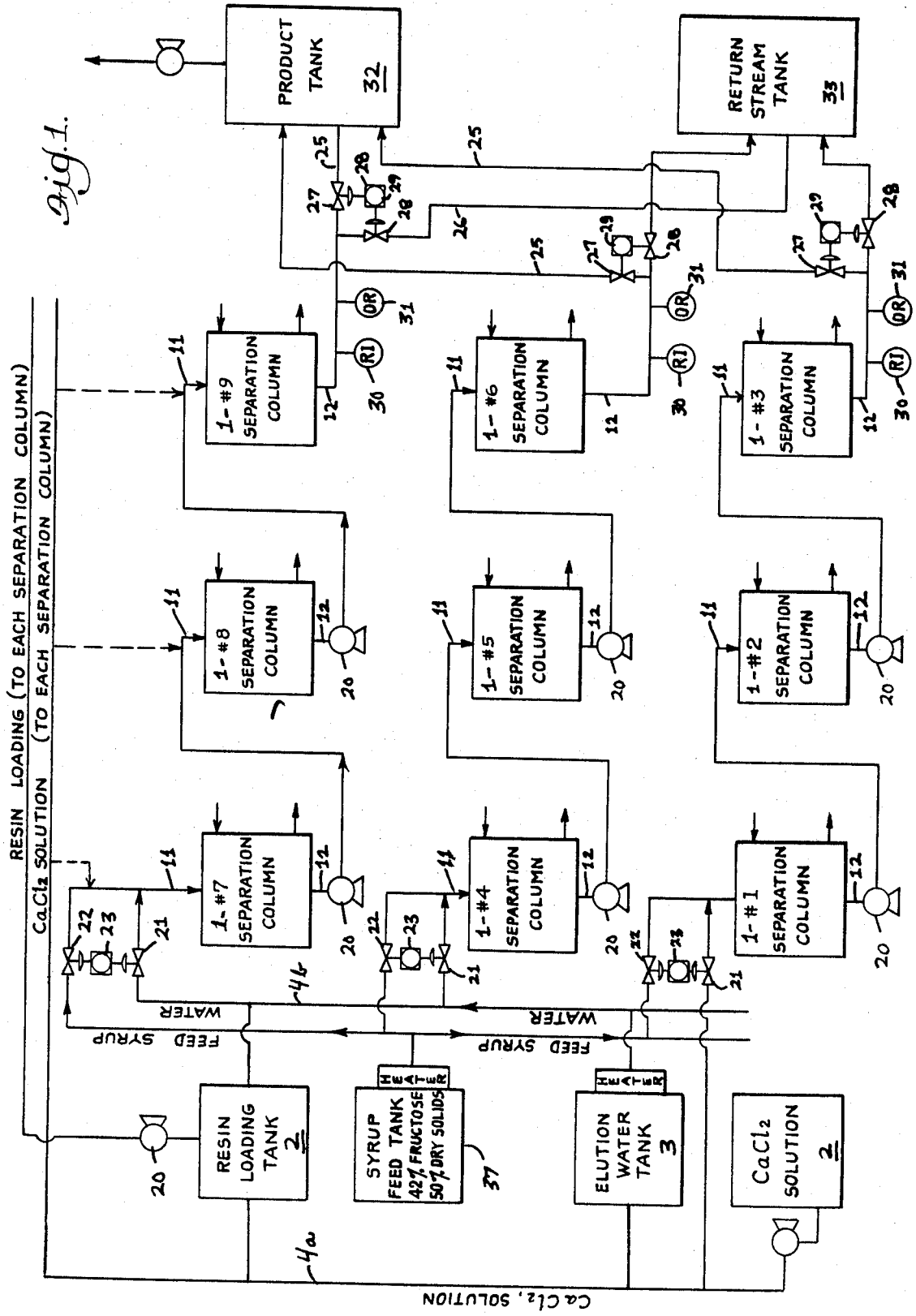
FIG. 1 is a plan view of a large volume commercial fructose/dextrose separation system.

In the present embodiment of the separation system shown in FIG. 1, the separation column 1-1 to 1-9 are initially loaded with Amberlite XE-200 resin from resin loading tank 2. The resin is first slurried in a 20–25% by weight calcium chloride solution, so that it shrinks to the desired void volume. The calcium chloride solution is supplied to the resin loading tank from elution water tank 3 through was water line 4a. Each separation column 1-1 to 1-9 is completely filled with the shrunken resin, and the column is sealed, except for the wash water line 4a. Deionized water is then fed into each column containing shrunken resin to wash away excess calcium ion, thereby causing the resin to swell. Since the columns are sealed the resin can only expand against itself, thereby decreasing the void volume of the resin, and packing the resin particles densely together.

The swelling of the resin also causes a positive pressure against the separation column which ranges from 3–17 psig, depending on the degree of contraction and subsequent expansion which are directly proportional to the concentration of calcium chloride solution employed. The resin expansion pressure is independent of the column height, although measurements taken near the base of the column must be corrected for the added pressure of the column. Typical expansion pressure exerted on the column walls when a 20% calcium chloride solution is used is about 3–10 psig.

Each separation column 1-1 to 1-9 is generally constructed as shown in FIGS. 2-4 of the drawings. The present columns are cylindrical, having a cylindrical side wall 5, a top wall 6 and a bottom wall 7. Top wall 6 is reinforced by a hemispherical header 8, and bottom wall 7 is reinforced by a similar hemispherical header 9. The present columns 1-1 through 1-9 are all about seven feet in resin bed height, and about fourteen feet in diameter. Because of the resin packing method employed, there is no requirement for internal baffles in the columns.

Headers 8 and 9 include flow distribution conduits 10 which communicate with inlet lines 11 and outlet lines 12 shown in FIG. 1. The headers 8 and 9 are also provided with a plurality of annular supporting rings 13 which maintain the top wall 6 and bottom wall 7 in substantially rigid, horizontal parallel planes. It is important, for proper separation efficiency, that the liquid flow through the separation columns be as uniform as possible throughout the width of the bed. Concentration of effluent across the lowermost horizontal plane in the resin bed of the third separation column should be as uniform as possible to obtain the most efficient fructose/dextrose separation.

Normally sealed access opening 14 can be used as a means for loading resin into the column. A similar, normally sealed access opening 15 is disposed near the base of the side wall 5, and can be used as a means for unloading resin from the column, and as an access for making repairs inside the column.

Top wall 6 and bottom wall 7 each comprise an inner stainless steel retaining screen 16 which confines the resin in the column. At present, NEVA-CLOG Screen, available from Multi-Metal Wire Cloth, Inc. Tappan, New York, is used as the resin retaining screen. It is described in U.S. Pat. No. 3,052,360. A stainless steel spacer means 17 is disposed just outwardly from the retaining screen 16 to space the retaining screen 16 and resin 18 from the respective end walls 6 and 7 of the column. The spacer means 17 provides a distribution flow means for the liquid feed stream and elution water entering and leaving the column through the conduits 10 which communicate through a plurality of openings 19 in the respective end walls 6 and 7 of the column. At present, the spacer means 17 comprises #16 gauge expanded stainless steel having 0.095 openings. The particular spacer means 17 presently employed is sold under the trademark POR-O-SEPTA, and is also available from Multi-Metal Wire Cloth, Inc., Tappan, N.Y.

FIG. 4 shows a detail illustrating the connection of conduit 10 through the end wall 7. Conduits 10 are disposed at regular spaced intervals across the end walls 6 and 7 to provide uniform liquid flow distribution through the end walls 6 and 7 to and from the spacer means 17 which is contiguous to the resin retaining screen 16. The direction of liquid flow can be reversed for purposes of backwashing the system, if this is found to be necessary.

The resin 18 presently employed in the columns is Amberlite XE-200 obtained from Rohm & Haas Corporation, Philadelphia, Pa. The resin is received in the sodium salt form, and is converted to the calcium salt form by the column loading procedure described above. The XE-200 resin is described as a strongly cationic, crosslinked nuclearly sulfonated polystyrene resin. The resin is crosslinked with about 4-6% by weight divinylbenzene to make it more stable. The resin particle size is in the range of 200-500 microns (30-50 mesh).

The resin is capable of separating fructose from a feed stream containing fructose and dextrose, and higher sugars when the feed stream is forced through the column at a controlled flow rate in successive pulses of a predetermined volume with each such pulse being followed by a pulse of elution water. Due to the difference in affinity between the resin and the respective sugars, the sugars leave the column in sequence. Higher sugars come out first, followed by dextrose and then fructose. The successive pulses of elution water release the fructose into the elution water to give a fructose-rich pulse of elution water following the preceding dextrose and higher sugars-rich pulse of the treated feed stream. The separation becomes more pronounced in direct relationship to the length of the resin bed and the amount of elution water used to remove the fructose from the bed. The fructose-rich elution water is collected by cyclic diversion of the output (effluent) stream from the last separation column in the series to the product tank when the fructose content is above 27-32%.

The various streams are pumped through the system in time controlled sequence by means of pumps 20. Flow of feed stream and elution water through each column is controlled by valves 21 and 22 which are operated by dual control means 23 to close valve 21 when 22 is open, and vice versa, thereby alternating the feed stream and elution water stream according to signals received from control means 23. In the present system, separation columns 1-1 to 1-3 are operated in series. Separation columns 1-4 to 1-6 are operated in a second series, and separation columns 1-7 and 1-9 are operated as a third series of columns. The three adjacent series of columns are typically operated together in parallel, and operated as a unit. Additional series of columns may be added to increase the total output of the system in direct proportion to the number of columns added. The columns may be operated on identical time cycles, or staggered so that one series of columns is receiving feed stream while another is receiving elution water.

The last separation column in the series includes an outlet line 24 which has two outlets 25 and 26. Direction of flow to outlets 25 and 26 is controlled by valves 27 and 28, respectively, which are controlled by a dual control means 29 which is similar to control means 23, so that as valve 27 closes, valve 28 opens. The output line 25 is controlled to be open when fructose-rich elution water is leaving column 1-3 through line 24.

The fructose content of the output stream is monitored by a refraction index meter 30 and an optical rotation meter 31 to further insure accurate control of the valves 27 and 28 and to insure that the desired product is directed through line 25 to product tank 32. When product is not being conducted into outlet 25, valve 28 is open, and the output from line 24 of the columns is directed to return stream tank 33. The material in return stream tank 33 can be recycled through the system to remove any remaining fructose, or it can be directed to other processing, such as isomerization process or an enzymatic conversion system employing glucoamylase to further convert its higher sugar content to dextrose. The return stream can also be sold as a lower grade product depending upon the economic returns possible. Product in product tank 32 is usually at a lower concentration than commercially desired and requires evaporation to reduce its water content. A typical high fructose product after evaporation has about 74-78% dry solids and comprises about 55% by weight fructose, 42% by weight dextrose and 3% by weight higher saccharides.

Heaters 34 and 35 are provided on elution water tank 3 and the syrup feed tank 37, respectively, to maintain the elution water and the feed stream at a temperature in the range of 140°-160° F. Operation at a lower temperature may allow microbial contamination of the resin beds, whereas temperatures higher than 160° F. creates a risk of product discoloration. The desired product at present is colorless.

When the system is in operation, the fluid pressure rises and falls in a cyclic fashion as the fluid flows through the packed bed of the separation column 1-1 to 1-9. In the normal separation operation, the degree of compaction of the resin bed, the column height, and the flow rate are substantially constant. The main variable is the cyclic fluid pressure change caused by the viscosity change as the concentration of the feed syrup varies from minimum water to the highest syrup concentration.

The XE-200 resin is capable of separating dextrose from fructose by molecular exclusion. The fructose is loosely retained by the resin bed in what is believed to be a calcium-fructose complex. The fructose remains intimately associated with the resin until the elution water stream apparently weakens the attraction of the fructose for the resin, and elutes the fructose from the resin in a cyclic manner as indicated by FIG. 5. It is possible to increase the concentration of fructose in the elution stream by increasing the amount of elution water, or recycling the enriched fructose streams to further separate dextrose and higher sugars from the fructose. By employing various recycle systems and by using additional elution water, it is possible to obtain substantially pure fructose, but economic factors must be taken into account. The time and energy involved with recycling streams, energy costs to evaporate a more dilute product, and commercial demand are all factors which must be considered in determining the concentration level of fructose to be manufactured by the system.

At the present time, all of the above factors dictate product having a fructose concentration in the range of 55-65% by weight fructose. The dextrose content of such a product is in the range of about 40-50% by weight. Higher sugar content can be kept below about 8% by weight.

FIG. 5 shows the concentration profile for the above system when the input feed stream is deionized 42% fructose, 50% dextrose, 8% higher saccharide corn syrup at about 50% dry solids. The feed syrup is obtained from enzymatic isomerization. Deionized elution water is sent through the separation column system through line 4, alternating with feed syrup fed through line 38.

Employing the above 42% fructose feed stream in the separation system described, the completed cycle through columns 1-1 to 1-3 takes about 330 minutes at a flow rate of 0.5 gal/min/sq. ft. During the typical 330 minute cycle, the concentration of the effluent increases from 1-48% by weight dry solids in about 150 minutes, and then decreases to 1% dry solids in 180 minutes.

During the same period of time, the fructose content of the effluent stream increases from 0-90% fructose in about 250 minutes and then rapidly decreases to about 0% concentration in the next 80 minutes. When a 55% fructose product is desired, the effluent is directed to product tank 32 when the fructose content is in the range of 28-32% and higher. The effluent is directed to the return stream tank 33 when the fructose content is lower than 28-32%.

The input feed and elution water should both be maintained within a rate of about 0.4-2.0 gpm/sq. ft. As the flow rate is increased, a higher pressure drop occurs across the column and somewhat less efficient separation results but the output volume increases. The optimum flow rate must be determined for a particular system based upon overall process economics.

When it is desired to make a 90% fructose product using the above separation system, the following steps may be employed. A feed stream, as described before, containing 42% fructose, 50% dextrose, 8% higher sugars at 50% dry solids is fed to the column for a period of time to feed a volume equal to 0.2-0.3 of the resin volume per cycle. The flow rate is 0.4-0.7 gpm/ft$^2$.

When the effluent stream from the system is at 60-75% fructose and 20-30% dry solids or higher, the effluent stream is diverted back through the columns as a recycle stream. Immediately after the above recycle stream is fed to the columns, elution water is added at a pH of 4-5. The total volume of elution water should be in the range of 0.2-0.7 of the resin volume per cycle at a flow rate of 0.4-0.7 gpm/ft$^2$. When the recycle stream effluent from the system reaches 80-87% fructose and over 5% dry solids, the effluent is directed to a product tank and collected as product.

The overall fructose concentration of this fraction is about 90% fructose or higher. The average dry solids of the products stream is about 16%, and the product may be further refined such as by filtering, evaporation and deionizing to produce a product having a dry solids of 79.5-80.5% and 90-92.5% fructose, about 5-7% dextrose and about 1-3% higher sugars.

The above detailed description illustrates the system and method of the invention has considerable flexibility. Fructose containing syrups ranging from a minimum of fructose to substantially pure fructose can be economically separated from mixed sugars containing fructose, dextrose and other polysaccharides. The same mixtures of sugars can produce product streams containing a minor amount of dextrose to substantially pure dextrose. Although the separation cost increases substantially as the concentration of fructose increases from 55-95%, it is estimated that a 95% fructose syrup can be produced at a cost of only about three times more than the cost of a 55% fructose syrup using the above system, and such intensely sweet products are in special demand in pharmaceuticals and as special dietary ingredients. Recycling of the elution water and other effluent fractions can further reduce the costs.

The resin packing system of the invention is a substantial advantage because it enables use of large capacity columns in excess of 12-14 feet in diameter without the added cost of an internal baffling system. The liquid distribution system provided between the columns further insures uniform flow through the total column system, and more effective product separation.

The input to each column section of the total system may be varied in almost limitless combinations, depending on the desired product output. The flow pattern can be modified to efficiently accommodate any recycle stream to obtain a particular desired product. Portions of the effluent stream may be diverted at different times to different alternative process systems.

Effluent streams high in dextrose are typically used to obtain additional fructose by isomerization. At the present time, the portion of the effluent stream containing about 12% fructose, 72% dextrose, or higher, and 6% high sugars at 18-19% dry solids is returned to the isomerization plant. Portions of the effluent stream rich in higher saccharides can be directed to a glucoamylase enzyme conversion system. The effluent streams can also be further divided, and part can be sent to either the isomerization plant or the glucoamylase enzyme conversion. It is also possible to further refine and sell the effluent by-products as low level sweeteners and for other uses.

The process and equipment of the subject invention for separation of mixed sugar solutions provides an improved, commercially feasible system to produce high fructose sweeteners from corn starch. For typical applications, a product containing 55-65% fructose is believed to be fully equivalent to sucrose sweeteners, and competitive in cost. Corn is grown over much wider areas and in substantially larger volume than sugar cane so that stable supplies at stable prices of raw material can be contemplated. In contrast, sugar cane and sugar beets are subject to the vagaries of weather and political conditions, so supplies of sucrose can fluctuate widely.

The above described process and system optimizes the chromatographic column separation of mixed sugars containing both fructose and dextrose to make possible a series of sweetener products derived from corn starch which are competitive with sucrose sweeteners, and in many cases, such products are more economical. The large diameter, densely packed series of separation columns are capable of continuous operation at large production rates which can be adjusted, as necessary, to produce 55-99% fructose from a feed stream containing 40-45% fructose and dextrose. The densely packed separation columns require no internal baffles or flow redistribution structures to produce good sugar separation because the tightly packed adsorbent bed is not subject to channeling, "front running", or other irregularities in liquid flow through the successive separation columns.

Since many embodiments of this invention may be made and since many changes may be made in the embodiments described, the foregoing is interpreted as illustrative and the invention is defined by the claims appended hereafter.

We claim:

1. In a chromatographic separation process wherein the chromatographic separation column is densely packed with an adsorbent to permit the separation of a fluid feed stream containing a mixture of substances into a plurality of streams richer in one or more of said substances by alternately passing said mixed fluid feed stream and an elution fluid stream through a chromatographic separation column to obtain an effluent stream in which the adsorbent has a selective affinity for one of said substances in said fluid feed stream so that portions of said effluent stream have higher concentrations of one of the substances, and thereafter separately collecting successive portions of the effluent stream having higher concentrations of at least one of the substances, the improvement which comprises:

(a) selecting an adsorbent which will contract to a reduced volume when exposed to a concentrated solution of a selected reagent and swells to an expanded volume by removing the concentrated solution from said adsorbent;

(b) confining the adsorbent in its contracted and reduced volume condition within the chromatographic separation column; and (c) thereafter removing a sufficient amount of the concentrated solution from the confined adsorbent to cause the adsorbent to swell so as to completely and uniformly pack the adsorbent throughout the column and thereby eliminate channeling within said column when said fluid stream is passed therethrough.

2. The method of claim 1 in which the column chamber is at least seven feet in height.

3. The method of claim 1 in which the mixed substances to be separated include monosaccharides, and at least one of the fluid streams is a liquid.

4. The method of claim 3 in which the substances to be separated include fructose and dextrose, and the mixed fluid feed stream is an aqueous solution.

5. The method of claim 4 in which the adsorbent is a crosslinked, nuclearly sulfonated polystyrene cationic resin.

6. The method of claim 5 in which the resin is crosslinked with 3-8% divinylbenzene.

7. The method of claim 6 in which the initial particle size of the resin is from 200-500 microns (30-50 mesh).

8. The method of claim 7 in which the cation bound to the resin is selected from the group consisting of alkali metals, alkaline earth metals, and silver.

9. The method of claim 8 in which the cation of the resin is selected from the group consisting of calcium, barium, strontium and silver.

10. The method of claim 8 in which the cation in the concentrated salt solution employed to shrink the resin comprises the same cation as the cation bound to the resin.

11. The method of claim 10 in which the cation bound to the resin and the cation of the concentrated salt solution are calcium.

12. In an improved process for separating a plurality of saccharides from a solution by liquid chromatography, the steps comprising:

(a) alternately passing a feed stream and an elution water stream through a large capacity separation column having a chamber therein containing a densely packed bed of a crosslinked nuclearly sulfonated polystyrene resin in a cationic form, said resin having been packed in the chamber by the process of claim 1; and (b) separately collecting portions of the effluent streams having higher concentrations of the respective saccharides.

13. The process of claim 12 in which the cation of the resin is selected from the group consisting of alkali metals, alkaline earth metals, and silver.

14. The process of claim 13 in which the cation of the resin is selected from the group consisting of calcium, barium, strontium and silver.

15. The process of claim 12 in which the cation of the resin is calcium, and the concentrated selected reagent used to initially reduce the volume of the said resin contains 10-35% by weight calcium chloride.

16. The method of claim 15 in which the initial particle size of the resin is about 200-500 microns and the final void volume of the densely packed resin is about 10% less than the initial void volume of the resin when in the sodium salt form prior to contracting the resin with concentrated calcium chloride solution.

17. The method of claim 5 including the step of passing the mixed fluid feed stream through a series of at least three of said separation columns, and the feed stream contains about 42% fructose, 50% dextrose and 8% higher saccharides, and a portion of the effluent stream contains about 55-65% by weight fructose, 38-50% dextrose, and no more than about 8% by weight higher saccharides.

18. The method of claim 5 in which a portion of the initial effluent stream rich in fructose is recycled, and the effluent stream including said recycled portion is collected to obtain a product containing at least 90% fructose, about 5-10% dextrose and about 1-3% higher sugars.

19. The method of claim 5 in which the fluid flow rate through the separation column is about 0.3 to 2.0 gallons per minute per square foot.

20. The method of claim 18 in which the flow rate is about 0.4-0.7 gpm/ft.$^2$.

21. The method of claim 5 in which the complete cycle of effluent stream collection, including product and by-product, is about 330 minutes.

22. In an improved method for separating a fluid feed stream containing a mixture of substances into a plurality of streams richer in one or more of said substances by alternately passing said mixed fluid feed stream and an elution fluid stream through a chromatographic separation column to obtain an effluent stream, said column having a chamber at least 6 to 30 feet wide, said chamber containing an adsorbent which has a selective affinity for one of said substances in said fluid feed stream so that portions of said effluent stream have a higher concentrations of one of the substances, and thereafter separately collecting successive portions of the effluent stream having higher concentration of at least one of the substances, the method including first densely packing the adsorbent in the chamber of said separation column, said chamber being devoid of any internal flow distributing structure, the steps comprising:

(a) selecting an adsorbent which contracts to a reduced volume condition in the presence of a selected reagent, and which swells when the excess concentrated reagent is removed;

(b) disposing said adsorbent in said separation column chamber in its reduced volume condition;

(c) effectively confining said adsorbent in said chamber of the separation column; and (d) thereafter removing the excess of said concentrated reagent from said confined adsorbent, whereby said adsorbent is caused to swell to completely and uniformly pack the adsorbent throughout the separation column chamber to eliminate channeling and turbulent flow, and to improve the uniformity of the cross-sectional flow rate across the column chamber when a fluid stream is passed therethrough.

23. The method according to claim 22 in which the feed stream containing a mixture of saccharide to be separated include monosaccharides, and at least one of the fluid streams is liquid.

24. The method according to claim 23 in which the feed stream mixture substances to be separated include fructose and dextrose and the mixed fluid feed stream is an aqueous solution.

25. The method according to claim 24 in which the adsorbent is a crosslinked, nuclearly sulfonated polystyrene cationic resin.

26. The method according to claim 25 in which the resin is crosslinked with 3–8% divinylbenzene.

27. The method according to claim 26 in which the initial particle size of the resin is from 200–500 microns (30–50 mesh).

28. The method according to claim 27 in which the cation bound to the resin is selected from the group consisting of alkali metals, alkaline earth metals, and silver.

29. The method according to claim 28 in which the cation of the resin is selected from the group consisting of calcium, barium, strontium and silver.

30. The method according to claim 28 in which the cation in concentrated salt solution employed to shrink the resin comprises the same cation as the cation bound to the resin.

31. The method according to claim 30 in which the cation bound to the resin and the cation of the concentrated salt solution are calcium.

32. The method of claim 22 for separating a plurality of saccharides from a solution by liquid chromatography the steps comprising:
(a) alternately passing a feed stream and an elution water stream through a large capacity separation column, having a chamber therein containing a densely packed bed of a crosslinked nuclearly sulfonated polystyrene resin in a cationic form, said resin having been packed in the chamber by the method of claim 22; and
(b) separately collecting portions of the effluent streams having higher concentrations of the respective saccharides.

33. The method according to claim 32 in which the cation of the resin is selected from the group consisting of alkali metals, alkaline earth metals, and silver.

34. The method according to claim 33 in which the cation of the resin is selected from the group consisting of calcium, barium, strontium and silver.

35. The method according to claim 32 in which the cation of the resin is calcium, and the concentrated selected reagent used to initially reduce the volume of said resin contains 10–35% by weight calcium chloride.

36. The method according to claim 35 in which the initial particle size of the resin is 200–500 microns and the final void volume of the densely packed resin is less than the initial void volume of the resin when in the sodium salt form prior to contacting the resin with concentrated calcium chloride solution.

37. The method according to claim 25 in which at least three of said separation columns are disposed in series, and the feed stream containing about 42% fructose, 50% dextrose and 8% higher saccharides, and the effluent stream is collected to yield a product containing about 55–65% by weight fructose, 38–50% dextrose, and no more than about 8% by weight higher saccharides.

38. The method according to claim 25 in which a portion of the initial effluent stream rich in fructose is recycled, and the effluent stream including said recycled portion is collected to obtain a product containing at least 90% fructose, about 5–10% dextrose and about 1–3% higher sugars.

39. The method according to claim 25 in which the fluid flow rate through the separation columns is at least about 0.3 to 2.0 gallons per minute per square foot.

40. The method according to claim 38 in which the flow rate is at least about 0.4–0.7 gallons per minute per square foot.

41. The method according to claim 25 in which the complete cycle of effluent stream collection, including product and by-product, is about 330 minutes.

* * * * *

UNITED STATES PATENT AND TRADEMARK OFFICE
CERTIFICATE OF CORRECTION

PATENT NO. : 4,366,060
DATED : December 28, 1982
INVENTOR(S) : Roger S. Leiser and Gin Chain Liaw It is certified that error appears in the above-identified patent and that said Letters Patent are hereby corrected as shown below:

Column 2, line 37; for "in" read ---is disclosed in---
Column 2, line 38; for "1968 U.S." read ---1968.  U.S.---
Column 3, line 29; for "distored" read ---distorted---
Column 3, line 55 and 62; for "3,044,094" read ---3,044,904---
Column 5, line 12; for 39-99+%" read ---30-99+%---
Column 5, line 52; for "was" read ---wash---
Column 6, line 49; for "0.095" read ---0.095"---

Signed and Sealed this

Fourteenth Day of May 1985

[SEAL]

Attest:

DONALD J. QUIGG

*Attesting Officer*  *Acting Commissioner of Patents and Trademarks*